No. 671,363. Patented Apr. 2, 1901.
W. W. WILLIAMS, J. W. WARNER, I. SPRINGER & J. AYDELOTT.
SOAP CUTTER AND SPREADER.
(Application filed June 20, 1900.)
(No Model.) 5 Sheets—Sheet 3.
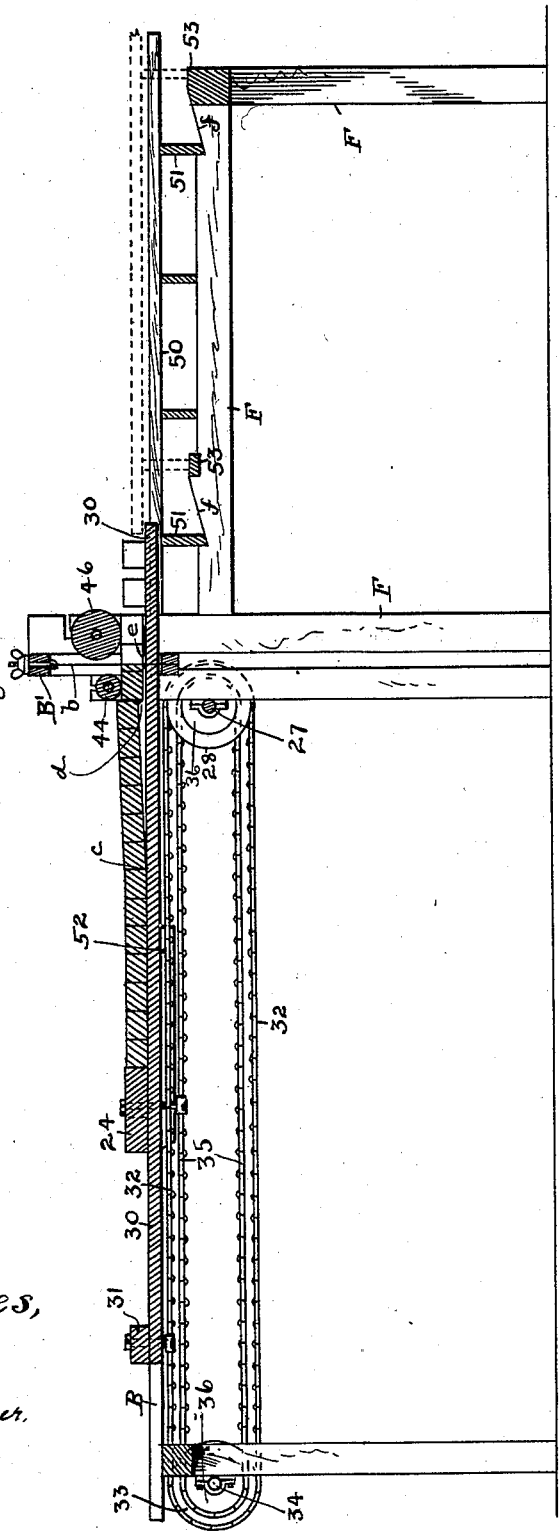

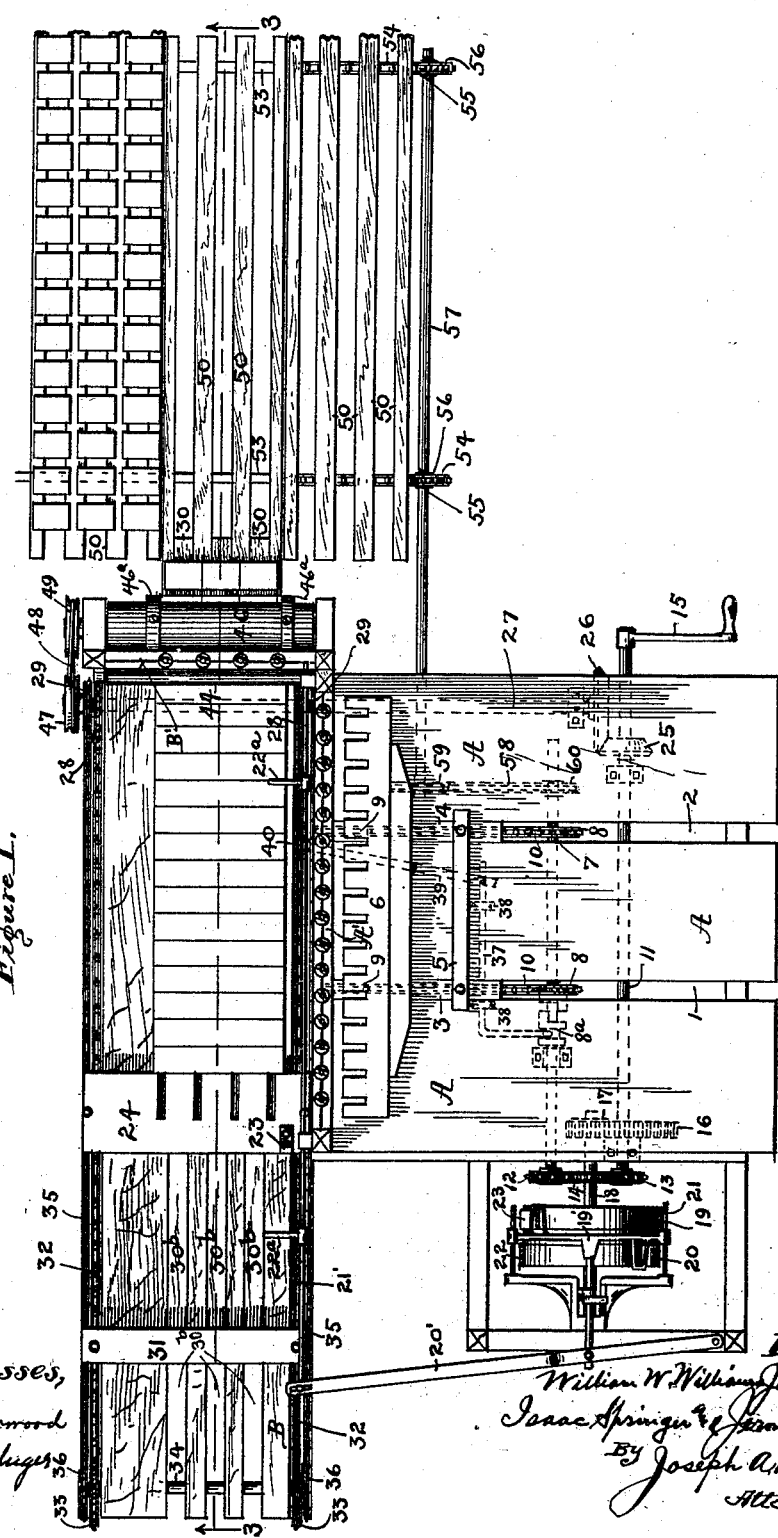

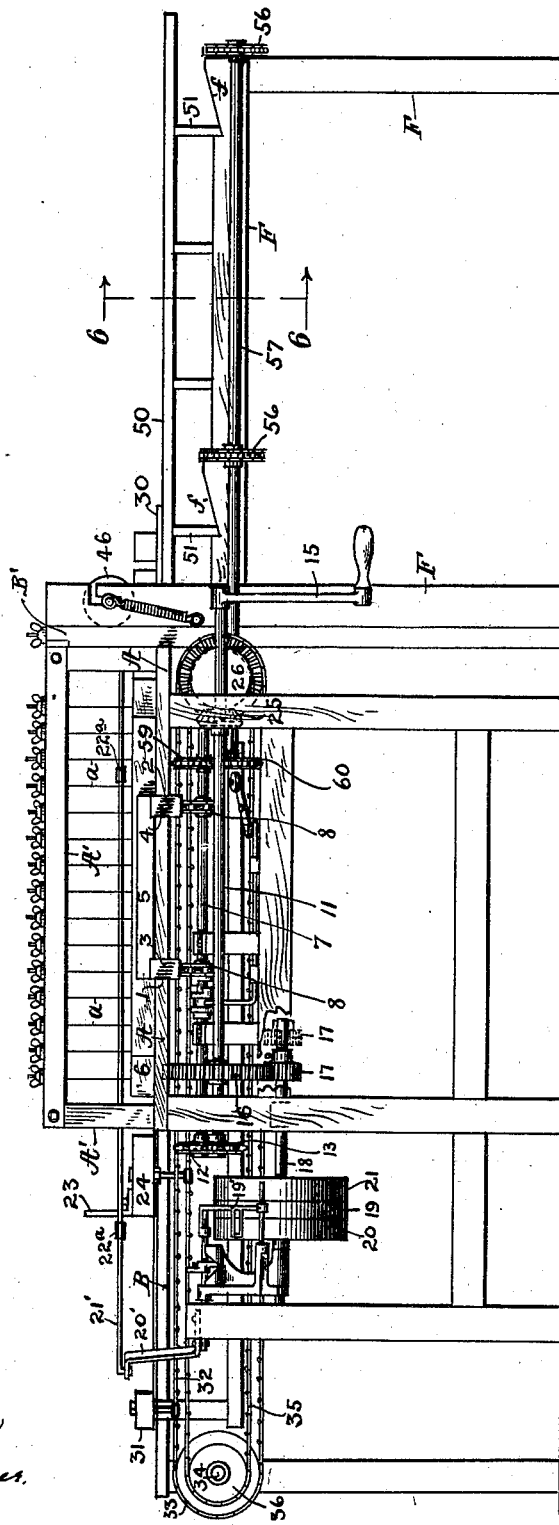

No. 671,363. Patented Apr. 2, 1901.
W. W. WILLIAMS, J. W. WARNER, I. SPRINGER & J. AYDELOTT.
SOAP CUTTER AND SPREADER.
(Application filed June 20, 1900.)
(No Model.) 5 Sheets—Sheet 4.
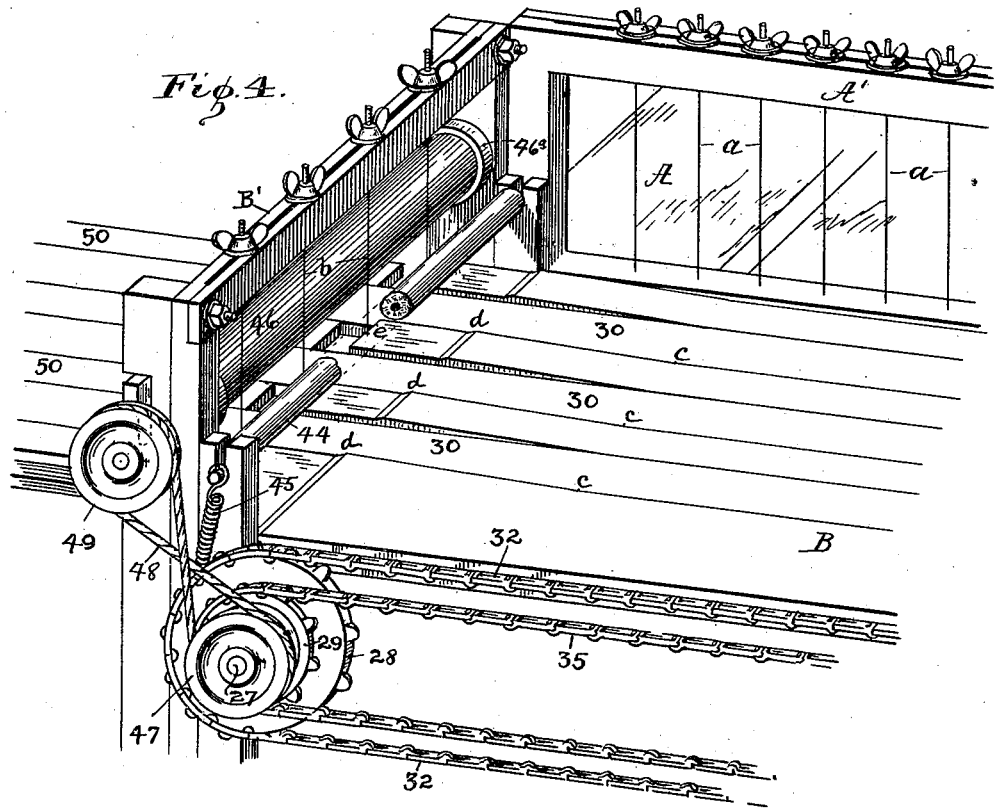
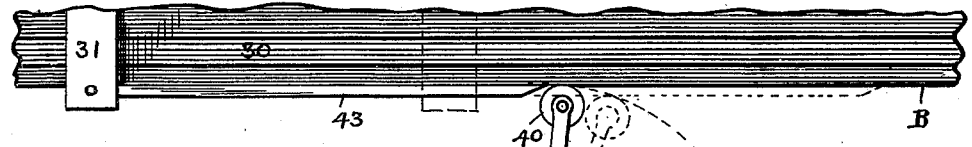
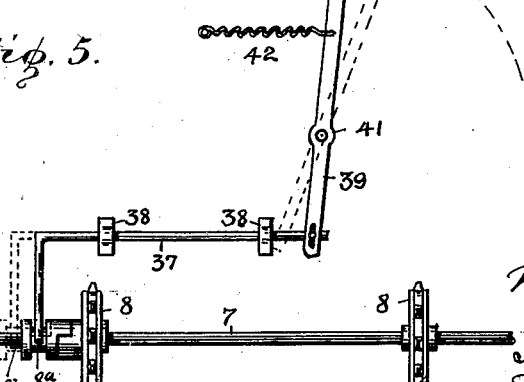
Witnesses,
John B. Sherwood
S. Mahlon Unger
Inventors,
William W. Williams
Joseph W. Warner,
Isaac Springer and
Jerome Aydelott.
By Joseph H. Milburn
Attorney,
THE NORRIS PETERS CO., PHOTO-LITHO., WASHINGTON, D. C.

No. 671,363.  
Patented Apr. 2, 1901.
W. W. WILLIAMS, J. W. WARNER, I. SPRINGER & J. AYDELOTT.
SOAP CUTTER AND SPREADER.
(Application filed June 20, 1900.)
(No Model.)  
5 Sheets—Sheet 5.
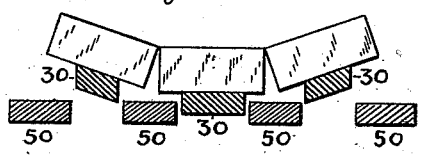
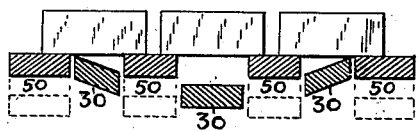
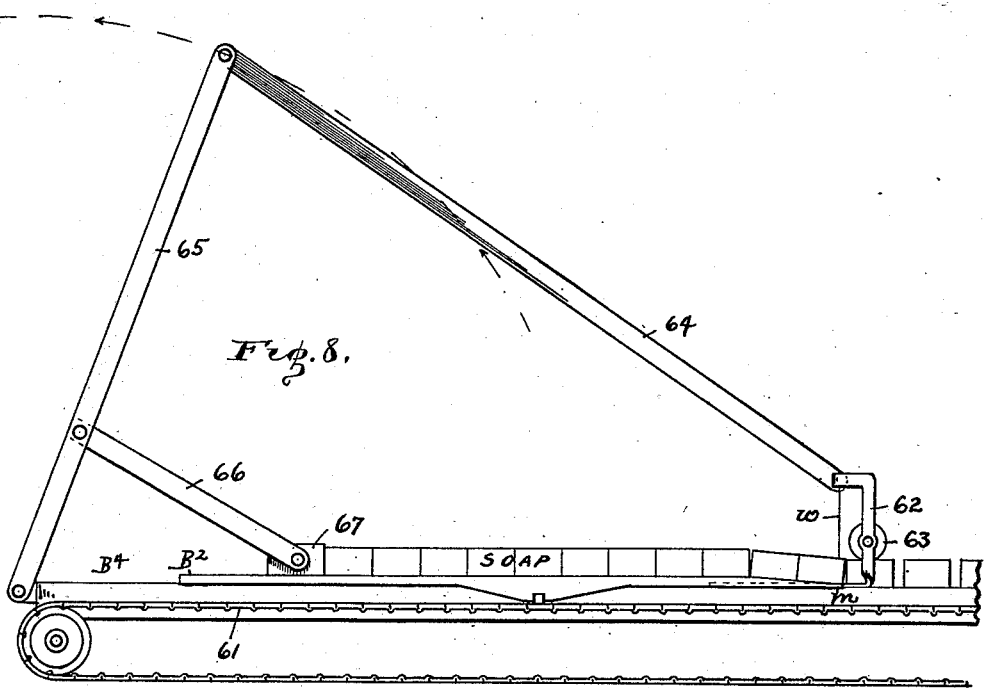

UNITED STATES PATENT OFFICE.

WILLIAM W. WILLIAMS, JOSEPH W. WARNER, ISAAC SPRINGER, AND JEROME AYDELOTT, OF INDIANAPOLIS, INDIANA; SAID WARNER, SPRINGER, AND AYDELOTT ASSIGNORS TO SAID WILLIAMS.

SOAP CUTTER AND SPREADER.

SPECIFICATION forming part of Letters Patent No. 671,363, dated April 2, 1901.

Application filed June 20, 1900. Serial No. 21,000. (No model.)

*To all whom it may concern:*

Be it known that we, WILLIAM W. WILLIAMS, JOSEPH W. WARNER, ISAAC SPRINGER, and JEROME AYDELOTT, citizens of the United States, residing at Indianapolis, in the county of Marion and State of Indiana, have invented certain new and useful Improvements in Soap-Cutting Machines with Spreading Attachments, of which the following is a specification.

This invention relates to improvements in machines for cutting slabs of soap into cakes and for automatically separating the cakes and laying them in this separated condition on trays to allow free circulation of air around them to facilitate their drying; and the object of the invention is to provide a simple machine which is positive in its action, durable, and inexpensive to manufacture and to keep in repair.

We accomplish the object of the invention by the mechanism illustrated in the accompanying drawings, in which—

Figure 1 is a top or plan view of our invention with a slab of soap cut through in one direction and partially cut through in the other of the two directions of the machine; Fig. 2, a rear side elevation looking in the direction of the arrow 2 of Fig. 1; Fig. 3, a longitudinal vertical section on the dotted line 3 3 of Fig. 1; Fig. 4, a detail in perspective of the spreading-rollers and the cutting-wires and adjacent parts, the small roller being broken away in part to show the parts beyond; Fig. 5, a detail in plan view of the clutch mechanism for throwing the first pusher-head in and out of gear; Fig. 6, a detail in vertical section of the outer table and tray with soap on the table before the tray has been elevated, the section being on the dotted line 6 6 of Fig. 2; Fig. 7, a like section showing the tray raised, and Fig. 8 a detail in side elevation of a modified form of spreading-table.

Like characters of reference indicate like parts throughout the several views of the drawings.

Referring to the accompanying drawings, A represents the table on which the slab to be cut is first laid and which we will designate the "first table" A. B is the second table, upon which the slab of soap cut into bars is delivered from the table A.

A' is a vertical rectangular frame at the edge of the table A, adjacent to table B, and has a series of vertical wires *a*, which cross the path of the slab of soap moving from A to B and cut the slab into bars in the usual and well-known way. The table A has the two parallel slots 1 and 2, which form guides for the bars 3 and 4, which have a sliding fit therein. These bars are kept from dropping through the slots in the table by the cross-bar 5 and the pusher-head 6. The slab of soap to be cut is placed on the table between the pusher-head 6 and the frame A', with its cutting-wires, the pusher-head being first drawn back from the frame A' a suitable distance to receive the slab.

Mounted under the table A is the horizontal shaft 7, having the two sprocket-wheels 8 8, and mounted approximately under the cutting-frame A' are the similar sprocket-wheels 9 9, (shown in dotted lines in Fig. 1,) and connecting the wheels 8 8 and 9 9 in pairs are the chains 10 10. These chains are under the respective bars 3 and 4 and are each connected to the bar above it, whereby when the shaft 7 is rotated the bars 3 and 4 will be correspondingly moved in their slots, thereby causing the pusher-head to move to or from the cutter-frame A'. The rotation of the shaft 7 is obtained by belting it with the parallel shaft 11 through the medium of sprocket-wheels 12 and 13 and chain belt 14. The opposite end of the shaft 11 is provided with the hand-crank 15, by which the shaft may be rotated by hand, and said shaft 11 also carries the spur-gear 16, which meshes with the teeth of small pinion 17 on the shaft 18. The shaft 18 has the fixed belt-pulley 19, on either side of which are the loose pulleys 20 and 21. Belts 22 and 23, (see Fig. 1,) driven from any suitable source of power and moving in opposite directions, actuate these pulleys and are shifted to start, stop, and reverse the direction of movement of the shaft 18 by the belt-shifter 19'. The belt-shifter 19' is pivotally secured to the lever 20', one end of which lever is fulcrumed to the frame of the machine and the other and slotted end of which is connected to the rod 21', mounted on frame A' to have longitudinal movement and having fingers 22ª 22ª, which project into the path of a standard 23, mounted on and moving with the pusher-head 24 of the table B. The standard travels between the two fingers and contacting with them near the end of each stroke moves the bar to which they are attached in a direction to shift the belt and reverse the direction of movement of the machine and cause the pusher-heads to return to the place of starting. The small pinion 17 on the shaft 18 is secured by setscrew, as shown in Fig. 2, whereby it can be loosened and slipped out of engagement with the large wheel 16, thereby releasing the mechanism from the power driving mechanism—as, for example, when it is desired to run the machine by hand-power. The shaft 11 also has the bevel-toothed wheel 25, which meshes with the bevel-toothed wheel 26 on the end of the shaft 27. Said shaft 27 is suitably mounted under the tables at right angles to the shaft 11 and extends from said shaft 11 to and a short distance beyond the far side of the table B and carries the sprocket-wheels 28 28 and 29 29, from which the moving platform 30 and the pusher-head of table B are driven.

The table B has a number of slots 30ᵇ, here shown as three, but more or less may be used, running longitudinally of it, which form ways for the slats 30, which are connected by the cross-head 31 and form a platform independent of or rather disconnected from the remainder of the table-top. The cross-head 31 is to connect the slats 30 and afford a means of attachment to the driving-belts 32. The ends of the cross-head 31 project beyond the edges of the table B, and said projecting ends are connected to the link belts 32, which pass around sprocket-wheels 28 and sprocket-wheels 33 on shaft 34 at the opposite end of table B from shaft 27. The sprocket-wheels 29 on shaft 27 outside of wheels 28 are connected by link belts 35 with sprocket-wheels 36 on the outside of wheels 33 on shaft 34, and these link belts 35 are connected to the pusher-head 24. It will be noted that the sprocket-wheels over which the chains connected to the cross-head 31 operate are larger than the wheels over which the chains connected to the pusher-head 24 operate, which construction causes the slatted platform to travel faster than the pusher-head above it travels.

The table B has a frame B', with vertical cutting-wires b, similar to A', previously described, the function of which frame and wires is to cut the bars of soap received from table A into cakes. The action of the two oppositely-traveling pusher-heads is so synchronized that after the pusher on table A has forced the slab of soap through the first series of cutting-wires, cutting the slab into bars, and has receded, the second pusher, being the one on table B, takes the slab which has just been cut into bars and pushes it through the second series of wires, cutting it into cakes. On account of the greater convenience in handling the slabs they will be made of greater length than width, and the length will be presented longitudinally of table B. The travel of the pusher-head on table A will consequently not need to be so long as that on table B, and to avoid the unnecessary travel of the pusher-head on table A we provide a clutch mechanism. (Shown in dotted lines in Fig. 1 and in detail in Fig. 5.) Referring to Fig. 5, the wheel 8 has a clutch half formed on its hub, and mounted on shaft 7 to slide longitudinally thereon is the opposite clutch half 8ª, having spline connection 8ᵇ therewith. This clutch half has a circular groove to receive the forked end of cranked rod 37. The rod 37 has only longitudinal movement in boxes 38. Lever 39 is connected with a pin on the rod 37, which pin projects through a longitudinal slot in the end of said lever 39. The other end of lever 39 carries a roller 40. The lever turns on pivot 41 and is drawn by spring 42 in a direction to unite the two-part coupling. The throw of the lever 39 in opposition to the spring and to dismember the clutch is obtained by the action of the push-bar 43, which is attached to cross-head 31 and is moved by the action of the cross-head into position between the table B and the roller 40. The forward movement against the roller forces its end of the lever 39 around into the position shown in dotted lines in Fig. 5, thereby uncoupling the wheel 8 from the shaft 7. As long as the roller is held back by the push-bar 43 the wheel 8 is uncoupled from its shaft; but when the push-bar is withdrawn from between the roller and the table the spring 42 draws the lever 39 around to complete the coupling.

The table B will extend to or, preferably, a very short distance beyond the cutting-wires b; but the slats 30, attached to the cross-head 31, are pushed out past the end of the table as the cross-head approaches the wires b. As the bars of soap pass the wires b and are cut into cakes they drop from the end of the table B upon the traveling slats 30, and because the rate of travel of the slats 30 is faster than the feed of the soap through the cutting-wires b the cake rows when delivered to the moving slats will be carried away from the row to follow, causing a separation of the rows equal to the difference of travel between the slats and the uncut bars of soap.

The soap being green and adhesive sticks together with such tenacity that the bars after passing the wires b do not separate readily from the main mass. To compel a separation, we provide offsets or drops in the surface over which the soap is then passing. We also provide superimposed rollers to force the soap down as the bars reach those drops. We prefer to lead up to the first offset with oblique or inclined surfaces, which by the change in level from said oblique surface to the next following horizontal surface causes a V-shaped gap to be formed between the bar of soap under the roller and the mass of soap following it. Referring to Figs. 3 and 4, $d\,e$ represent the horizontal but elevated end portions of the platform B. $d$ is the first offset or drop, and $c\,d$ the oblique surfaces leading from the main table-level to the raised ends. 44 is a roller under which the soap passes. It is drawn down by the springs 45. After the bars of soap are cut into cakes by passing through the wires $b$ the cakes drop down off of the raised ends $e$ of the table upon the traveling slats and travel faster than the soap mass behind it by the roller 46 holding the cakes directly under it down on the traveling slats. This roller will be larger than roller 44 and will be heavy enough to bear down on the soap cakes without requiring springs to be used, although springs may be used if the friction does not prove sufficient.

The roller 46 is driven at the same rate of speed as the traveling platform 30 moves, whereby a regular discharge without any forging ahead or lagging behind of the soap is obtained, thereby insuring a uniform spreading apart or separating of the rows of cakes.

A pulley 47 on shaft 27 is connected by crossed belt 48 with pulley 49, of same size as 47, on the axle or shaft of roller 46.

Having thus described the means by which rows of soap cakes are separated from each other, we will now describe the means whereby the cakes are separated from each other in the rows.

By referring to the cross-section, Figs. 6 and 7, it will be seen that the slats 30 have not their top surfaces in horizontal alinement, but that the outer edges of the outside slats are elevated. This produces, in effect, a concave trough-like surface, which causes the cakes deposited thereon to separate, with inverted-V-shaped openings between them. As shown in Figs. 1, 6, and 7, the slats 30 are pushed out between the slats 50 of a tray; but the tray-slats, as shown in Figs. 2, 3, and 6, are primarily below the top surfaces of slats 30. The tray-slats are held together by vertical boards 51, and these are supported on a frame F, having inclines $f$, on which the boards 51 rest, and by pushing said boards up said inclines by contact therewith of pusher-bar 52 (see Fig. 3) the tray will be elevated, as shown in dotted lines in Fig. 3 and in full lines in Fig. 7, and the soap lifted by the tray-slats 50 off of the slats 30. It will be found that the cakes of soap in each transverse row are separated from each other in the manner shown in Fig. 7. At the tops of the inclines $f\,f$ are the horizontal bars 53, which extend on either side of the frame F distances equal to the width of a tray, and traveling over the rear ends of the bars are the chains 54 with spurs 55. The unfilled trays will be placed one at a time on the ends of the bars, where the chains run, and will be carried by the spurs of the chains and deposited upon the frame F. The chains are driven from sprocket-wheels 56 on shaft 57, and the shaft 57 is driven by belt 58, running from pulley 59 on shaft 57 to pulley 60 on shaft 7. When the tray full of soap is elevated by being pushed up the inclines $f$, an empty tray placed on the bar extensions is carried in by the chains and pushes the newly-loaded tray off of the frame F upon the bar extensions on the opposite side of the frame F. Then the newly-added frame is pushed down the inclines into position to receive a new load, and the filled tray at the side is carried away and deposited in a drying-rack.

In the modification shown in Fig. 8 the main table $B^4$ has an auxiliary table $B^2$ sliding longitudinally thereon. This table $B^2$ is driven by connection with chain belt 61, a lug from one of the links of the chain entering a notch in a bracket from the table and being removably inserted to permit of disengagement to permit the lug to travel in continuous circuit. The end of the table $B^2$ is at $m$. Extending forward of it a few inches and then turned up vertically on each side of the platform and connected across the top after being bent back so as to bring the cross-piece over the end of the platform is the strap-iron bar 62. The cutting-wires $w$ connect with the end of the platform at the bottom and with the cross-piece at the top. The vertical standards form supports for a roller 63 at a position suitably in advance of the platform $B^2$. The top of bar 62 is connected by bar 64 with the top end of lever 65. The lower end of lever 65 is pivotally secured to the end of table $B^4$, and between the two ends of the lever 65 is pivoted the end of bar 66, the lower end of which is pivotally secured to the pusher-head 67, resting on top of the platform $B^2$.

The action is as follows: The platform $B^2$, having soap in bars deposited on it from the first table, is carried back toward the lever 65, and through bar connection 64 the lever 65 swings to the rear, carrying with it the head 67; but said head by reason of its connection with lever 65 near to the fulcrum of that lever moves at a much slower rate than the platform $B^2$ does. Consequently the soap is pushed off of the platform $B^2$, or, rather, the platform $B^2$ slides from in under it, and if the head 67 were stationary the soap would be deposited on the table $B^4$ without any relative change of position; but the head 67 also moves slowly back, and the soap by consequence is separated on the table $B^4$.

$46^a$ on the roller 46 represents radial enlargements which break off the waste edges or trimmings of the soap slab, allowing them to drop down out of the way to be worked over again.

Having thus fully described our invention, what we claim as new, and wish to secure by Letters Patent of the United States, is—

1. In a soap cutter and spreader, a stationary and a moving platform, means for transferring the soap from the former platform to the latter and a cutter to cut the soap intermediate of the platforms.

2. In a soap cutter and spreader, a stationary and a moving platform, means for transferring the soap from one platform to the other, a cutter to cut the soap as it changes platforms and a roller attached to the platform from which the soap is transferred, said roller being adapted to roll across the newly-cut soap and hold it immovably on its platform, substantially as described.

3. In a soap cutter and spreader, a stationary and a moving platform, means for transferring the soap from one platform to the other, a cutter to cut the soap as it changes platforms and a roller being adapted to roll across the newly-cut soap and hold it immovably on its platform while the travel of the moving platform separates the soap held by the roller from the soap being cut, substantially as described.

4. In a soap cutter and spreader, a stationary slatted platform, a slatted traveling platform working in the spaces between the slats of the stationary platform, soap-cutters at the end of the stationary platform and a pusher-head to push the soap against the soap-cutters, said pusher-head adapted to travel at a slower rate of speed than the traveling platform, substantially as described.

5. In a soap cutter and spreader, a stationary platform, a second platform moving longitudinally of the first, a head moving at a slower speed than the traveling platform to transfer the soap from one platform to the other and a cutter to cut the soap as it changes platforms, substantially as described.

6. In a soap cutter and spreader, a stationary table, a traveling table moving longitudinally of the stationary one, vertical cutting-wires at the end of the stationary table, a traveling head to force the soap through the wires and a roller adjacent to the outer side of the wires having the same rate of travel as the traveling table, substantially as shown.

7. In a soap-machine, the combination with a table over which the soap in bars is passed, said table having irregularities of surface, of a roller to press the bars of soap against the irregular surface, as and for the purposes specified.

8. In a soap-machine, a table, soap-cutters, means for moving the soap slab on the table through the cutters, a moving table to receive the soap after it is cut, said moving table being adapted to travel at a greater speed than the soap slab, and a roller adapted to roll over the newly-cut soap at a greater speed than the soap block is moving, as and for the purposes specified.

9. In a soap-machine, the wire cutters to cut the soap, means for forcing the soap through the cutters, platforms to support the soap before and after cutting and a roller adjacent to the cutters being adapted to roll over the newly-cut soap at a greater speed than the soap is fed through the cutters, as and for the purposes specified.

10. In a soap-machine, a table having vertical wires in a row across one of its ends to cut the soap, a pusher-head having a to-and-fro movement toward said wires, a second table to receive the soap which is pushed through the cutting-wires from the first table, said second table having cutting-wires at its end and having a pusher-head to push the soap through said cutting-wires, the travel of the pusher-head of the second table being longer than that of the first, means for driving said pusher-heads from a common shaft and means for automatically connecting and disconnecting the pusher-head having the shorter travel, as and for the purposes specified.

11. A table having a row of vertical cutting-wires across one end, a pusher-head having to-and-fro movement toward said cutting-wires, a revoluble shaft, sprocket-wheels mounted thereon, chain belts driven by said sprocket-wheels and connected with the pusher-head, a clutch-half on the hub of one of the sprocket-wheels, a mating clutch-half on the shaft, a shifting rod engaging the last clutch-half, a lever to which the rod is connected, and a traveling bar to contact with the lever and swing it to disengage the clutch and a spring to draw the lever in the direction to close the clutch, substantially as described.

12. A longitudinally-slotted table, slats seated in said slots connected by a cross-head, cutting-wires at the end of the table, a pusher-head traveling on the slats and slotted table, a revoluble shaft, sprocket-wheels mounted on said shaft, chain belts connecting said sprocket-wheels with the cross-head, other and smaller sprocket-wheels mounted on said shaft and chain belts connecting said smaller sprocket-wheels with the pusher-head, substantially as described.

13. In a soap-cutting machine, a roller being adapted to roll over the cut soap, said roller having annular enlargements to break off the waste edges of the soap slab, as described and shown.

14. A longitudinally-slotted platform having soap-cutters at one end, a longitudinally-slotted tray at the cutter end of the platform with its slots registering with those of the platform, said tray being primarily below the level of the top of the platform, inclined slides supporting the tray, a slatted traveling platform mounted in the slots of the slotted platform and entering the slots of the tray when pushed beyond the limits of the slotted platform, and means for elevating the surface of the tray above the surface of the slatted platform by pushing it up the inclined slides, substantially as described.

15. In a soap-machine, a table having soap-cutters at one end, a pusher to push the slab of soap through the cutters and a table or platform traveling faster than the pusher, to receive the soap as it comes from the cutters, substantially as shown.

16. In a soap-machine, a table having soap-cutters at one end, a pusher to push the slab of soap through the cutters, a traveling slatted platform to receive the cut soap, a slatted tray at the end of the table between the slats of which the slats of the platform pass, said tray being primarily below the platform, and means for elevating the tray to take up the soap at the end of the slotted platform's travel, substantially as described and shown.

17. In a soap-machine, a traveling slatted platform carrying the soap away from the last cutting mechanism, the middle of said slats being horizontal and the adjacent slats having their outer edges elevated to form an approximately hollowed or concave surface, a slatted tray between the slats of which the slats of the platform pass, the top of said tray being horizontal and initially below the slatted platform, and means, when the slatted platform reaches the end of its travel, of raising the tray above said platform, as and for the purposes specified.

18. In a soap-machine, a table having soap-cutters at one end, a pusher to push the soap through the cutters, and a platform traveling faster than the pusher to receive the soap as it comes from the pusher said table being higher at its side edges than at its middle and being slotted longitudinally, a slatted tray the slats of which register with the slots of the traveling platform the top of said tray being initially below the upper surface of the traveling platform, and means for raising the tray above the platform when the platform reaches the end of its travel, substantially as shown and specified.

19. The combination with a soap-cutting machine of the kind described and shown, of a longitudinally slotted and curved platform traveling faster than the soap is delivered through the cutting mechanism, a tray with slats registering with the slots of the platform, the surface of said tray being horizontal and initially below the platform, means for elevating the tray at the end of the platform's travel and for moving it laterally and replacing it with an empty tray.

20. In a soap-machine, a table having soap-cutters at one end, a pusher to push the soap through the cutters, a platform traveling faster than the pusher, to receive the soap as it comes from the cutters and a roller traveling with the same speed as the platform, placed outside and adjacent to the cutters, substantially as described.

21. A table, vertical wire cutters along one edge, a pusher having a to-and-fro movement toward said cutters, a revoluble shaft, means for intermittently connecting the said pusher with said shaft, a second table opposite the cutter end of the first also having wire cutters at one end, said table being slotted longitudinally, a slatted platform working in said slots the middle slat of said platform being horizontal and the side slats being oblique thereto, a pusher-head on said second table, a shaft transverse to said second table having bevel-gear connection with the said revoluble shaft, sprocket-wheels on said transverse shaft having chain connection with the slatted platform, smaller sprocket-wheels on said transverse shaft having chain connection with the pusher-head, a roller outside of the last cutters, a tray with slats between which the slats of the slatted platform take, the surface of said tray being initially below the slatted platform and means for elevating the tray above the platform when the latter reaches the end of its travel, substantially as described.

In witness whereof we have hereunto set our hands and seals, at Indianapolis, Indiana, this 12th day of June, A. D. 1900.

WM. W. WILLIAMS. [L. S.]
JOSEPH W. WARNER. [L. S.]
ISAAC SPRINGER. [L. S.]
JEROME AYDELOTT. [L. S.]

Witnesses:
JOSEPH A. MINTURN,
S. MAHLON UNGER.